United States Patent [19]
Howell et al.

[11] 4,170,731
[45] Oct. 9, 1979

[54] FIBER OPTIC CONTROL MODULES AND SYSTEM EMPLOYING THE SAME

[75] Inventors: Melvyn J. Howell; Raymond C. Pilch, both of Elmhurst, Ill.

[73] Assignee: Miller Fluid Power Corporation, Bensenville, Ill.

[21] Appl. No.: 719,063

[22] Filed: Aug. 30, 1976

[51] Int. Cl.² .......................... G02B 5/14; H01J 5/16; H01J 39/12
[52] U.S. Cl. ................................. 250/227; 340/365 P; 350/96.20
[58] Field of Search .................. 250/227, 237 R, 229, 250/231 R; 350/96 R, 96 C, 96.21, 96.22, 96.20; 340/365 P

[56] References Cited
U.S. PATENT DOCUMENTS

| | | | |
|---|---|---|---|
| 3,562,540 | 2/1971 | Hirsch | 250/227 |
| 3,761,719 | 9/1973 | Stoever | 250/227 |
| 3,787,837 | 1/1974 | Allen et al. | 340/365 P |
| 3,790,791 | 2/1974 | Anderson | 250/227 |
| 3,878,397 | 4/1975 | Robb et al. | 350/96 C |
| 3,946,467 | 3/1976 | Lukas et al. | 350/96 C |
| 3,976,876 | 8/1976 | Brocker | 250/227 |

*Primary Examiner*—Alfred E. Smith
*Assistant Examiner*—David K. Moore
*Attorney, Agent, or Firm*—Wegner, Stellman, McCord, Wiles & Wood

[57] ABSTRACT

Disclosed are control modules for use in systems utilizing flexible, optical fiber bundles, which control modules include an optical switch and an optical receiver. Each is provided with quick-disconnect fittings for receipt of optical fiber bundles. Also disclosed is a control system for an apparatus including a machine having mechanical parts which perform a series of operations wherein the control inputs to the machine are generated by the control modules operated in response to mechanical movements of the machine.

13 Claims, 3 Drawing Figures

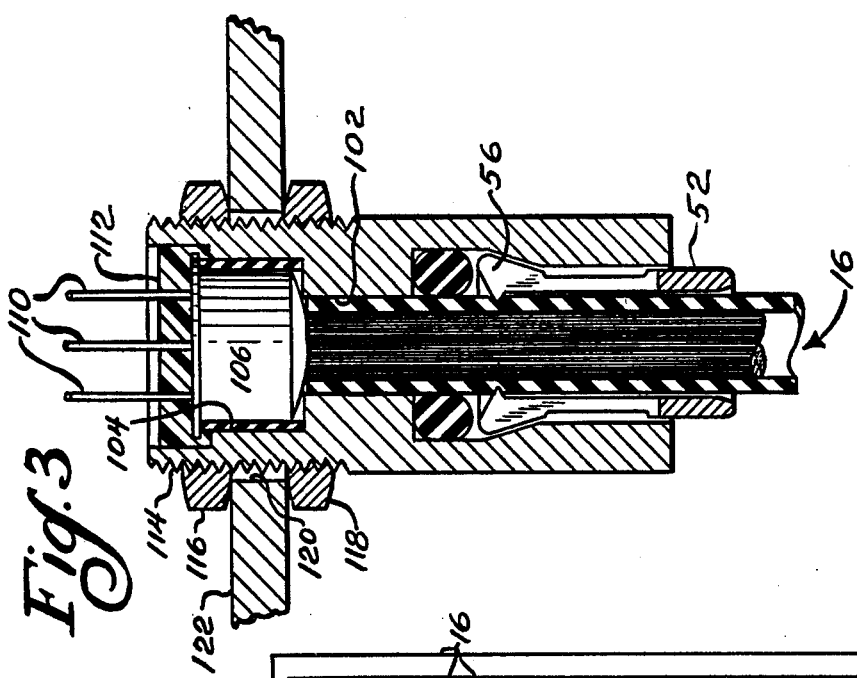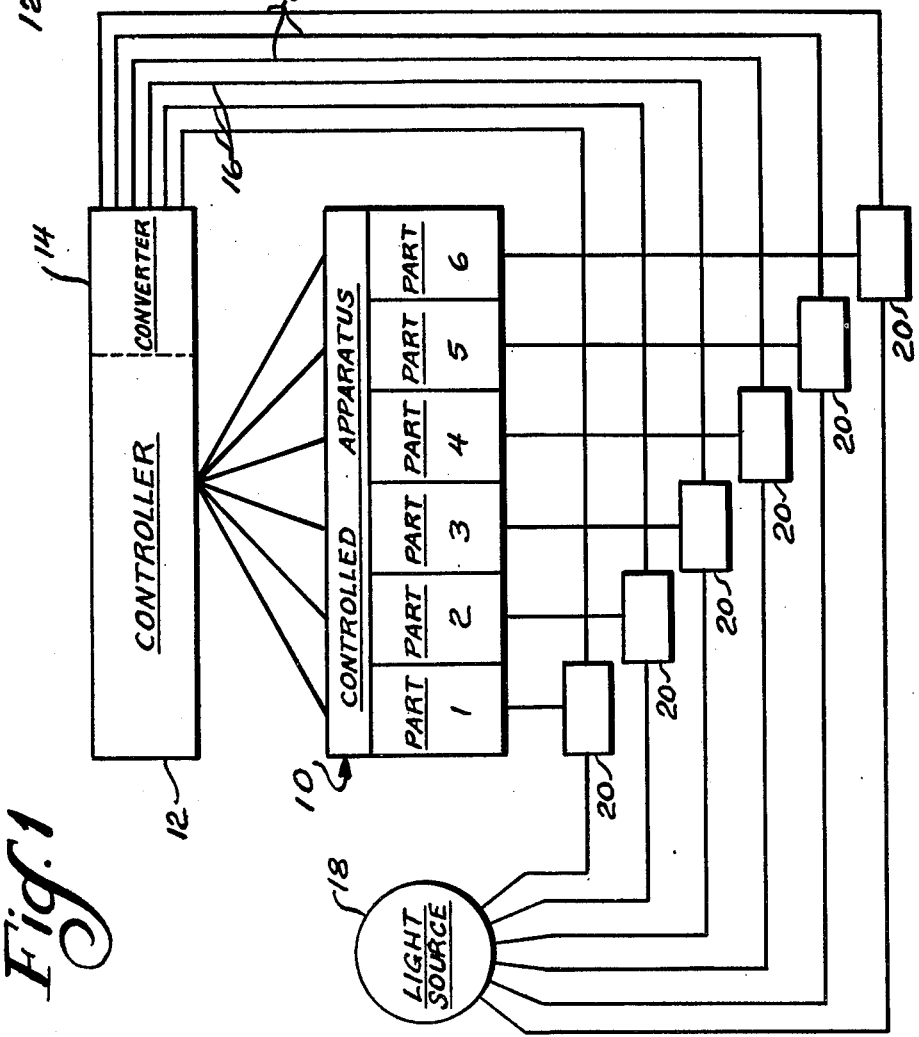

FIBER OPTIC CONTROL MODULES AND SYSTEM EMPLOYING THE SAME

BACKGROUND OF THE INVENTION

This invention relates to fiber optics, and, more specifically, to control modules for fiber optic control systems and a fiber optic control system for an apparatus.

Purely electrical controls for apparatus such as machine tools, packaging equipment, or the like, are limited in application due to a variety of factors. In many instances, where the equipment is operated in a potentially explosive atmosphere, electrical controls cannot be employed due to the possibility of electrical arcing at switch contacts igniting the surrounding atmosphere. Other difficulties attend the use of electrical controls in many environments. For example, due to building codes, wires employed in electrical controls must be housed in conduits and thus installation expenses can become quite high. In other instances, deterioration of contacts may require significant maintenance and/or cause excessive down time. In addition, many electrical components used in control circuits as, for example, relays, are quite expensive.

Troubleshooting of electrical circuits is often difficult due to the need for specialized equipment used for testing purposes.

As a consequence, there is an increasing rate of use of other types of control systems as, for example, pneumatic control systems utilizing miniaturized valves. Such air control systems possess significant advantages over electrical systems in terms of ease of maintenance, lesser initial expense, ability to operate in hazardous environments, etc. Moreover, because many such systems employed today allow interconnection of the various components with flexible plastic tubing, installation expense is minimal.

However, because such systems utilize interengaging, movable, mechanical parts, as valves and valve seats, they are subject to wear and ultimate failure, thereby requiring some maintenance and causing some down time.

Moreover, because such systems employ compressed air, their reliability is, to some extent, dependent upon the user's following a good maintenance procedure with his source of compressed air so that only clean compressed air is provided to the system components. Therefore, some preventive maintenance is required even with air systems.

Thus, there is a real need for a control system that retains all the advantages of known air systems over electrical systems and yet further minimizes such maintenance difficulties as are associated therewith.

SUMMARY OF THE INVENTION

This invention relates to control systems and, more specifically, to control systems for apparatus utilizing fiber optics. The invention also relates to control module components utilized in such systems.

An exemplary embodiment of the invention, in terms of a system, envisions an apparatus including a machine having moving mechanical parts for performing a series of operations, a control means for the machine for controlling the performance of the operations performed thereby, a light source, a plurality of photoelectric devices for providing electrical inputs to the control means, a plurality of optical masks, a plurality of elongated, flexible, optical fiber bundles extending from the light source to associated ones of the photoelectric devices with each bundle having an air gap therein, a means mounting the masks for movement into and out of the air gap in an associated one of the bundles, and means linking the masks and the machine parts for movement of the masks into and out of the air gaps in response to movements of the machine parts to allow and preclude the passage of light from the light source to the photoelectric devices to thereby selectively provide electrical inputs to the control means whereby operation of the machine may be controlled by the control means.

A preferred form of the invention contemplates that the optical masks referred to in the preceding paragraph be, in effect, optical switches which include a switch body, a passage extending through the body and having a straight line portion within the body, a pair of fittings on the body, one at each end of the passage and each including a bore aligned with the passage and having selectively operable grippers disposed within the bore for gripping the exterior of an optical fiber bundle inserted in the bore, a cavity within the body and intersecting the straight line portion of the passage and wherein the mask is in the form of an opaque mask mounted in the body within the cavity for movement between positions into and out of the straight line portion of the passage, and an operator on the body for moving the mask between the aforementioned positions, the operator being linked to machine parts.

A preferred form of the invention also contemplates that the photoelectric devices be modules including a body having a passage therein for receipt of one end of the associated optical fiber bundle. A photoelectric semiconductor is disposed within the passage and has a photosensitive surface in direct light-receiving relation therein. A fitting is provided for securing one end of the associated optical fiber bundle within the passage and includes a sleeve movable axially within the passage and having axially extending spring fingers terminating in radially inwardly directed projections. The passage and the fingers are configured such that for one position of the sleeve within the body, the projections may move radially outwardly to allow one end of the associated optical fiber bundle to be inserted into and removed from the passage and, for another position of the sleeve within the body, the projections cannot move radially outwardly and thus will firmly grip the end of the associated optical fiber bundle within the passage.

Other objects and advantages of the invention will become apparent from the following specification taken in connection with the accompanying drawings.

DESCRIPTION OF THE DRAWINGS

FIG. 1 is a schematic view of an apparatus utilizing optical fiber bundles in a control system;

FIG. 3 is a sectional view of a photoelectric device made according to the invention.

DESCRIPTION OF THE PREFERRED EMBODIMENT

Figure 2:
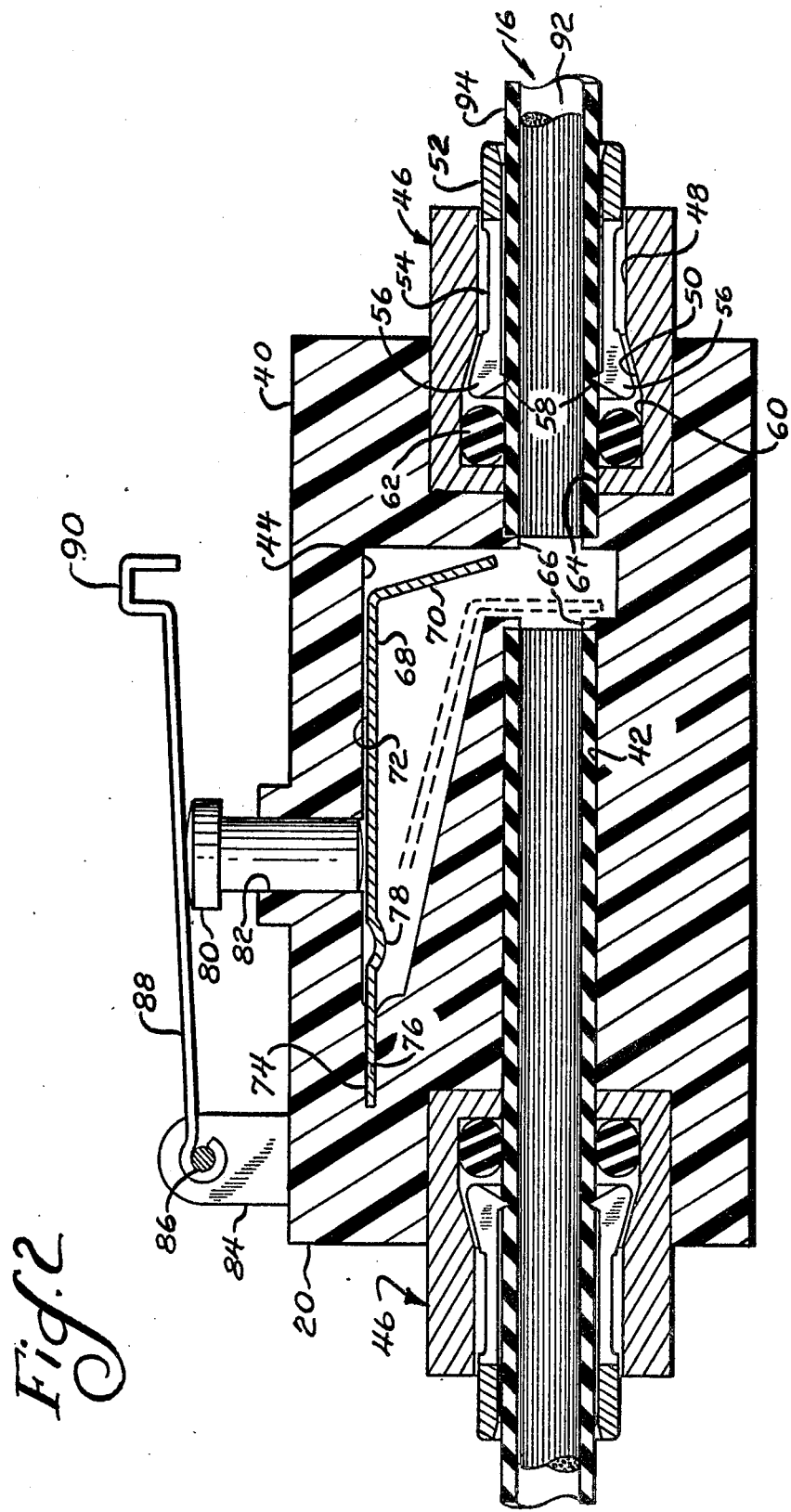
FIG. 2 is a sectional view of an optical switch made according to the invention.

An exemplary embodiment of the invention is illustrated schematically in FIG. 1 and is seen to include a controlled apparatus or machine, generally designated 10, as for example, a machine tool, a packaging apparatus, or any other type of apparatus having plural, movable, mechanical elements which perform a series of operations, generally in a sequential manner. For purposes of illustration, the machine 10 includes six movable components indicated schematically by the legends PART 1, PART 2, etc. In many cases, the movable elements will include some sort of a motor as, for example, a fluid cylinder, while, in other cases, each part may include a clutching mechanism which is selectively engaged to drive the part from a common drive source.

The machine 10 is controlled by a controller 12 which will provide control commands to each of the parts in the form of electrical, fluidic, or mechanical signals. The controller 12 may be a programmed computer or may be a specially fabricated network of logic gates designed to provide certain control directions to the machine 10 upon receipt of particular data relative to the progress of the machine 10 through an operating cycle.

The controller 12 includes an input section 14 in the form of a converter which converts light signals to electrical signals for use by the remainder of the controller 12. Light signals are directed to the converter 14 on any one or more of elongated optical fiber bundles 16 having respective ends terminating within the converter 14. The bundles 16 and their arrangement with respect to the converter 14 will be described in greater detail hereinafter.

The opposite ends of the fiber bundles 16 face a light source 18 to receive light therefrom for transmission to the converter 14. Intermediate the ends of each fiber bundle 16 is an air gap defined by one or more optical switches 20. As illustrated in FIG. 1, there is only one such switch 20 in each of the bundles 16 and, as will be seen, they perform an "off-on" function, either allowing or precluding the transmission of light from the source 18 to the converter 14. However, it is to be understood that more than one switch 20 could be employed in each bundle 16 depending upon logical functions and input information to be transmitted to the converter.

As illustrated in FIG. 1, each of the switches 20 is mechanically linked to a corresponding one of the mechanical parts of the apparatus 10. Thus, movement of the associated part of the apparatus 10 will cause the associated switch 20 to transmit or preclude the transmission of light, as mentioned above.

A typical sequence of operation for the apparatus schematically shown in FIG. 1 could be as follows. Upon startup of the apparatus, the controller will issue a signal to the machine 10 to cause the mechanical Part 1 to perform the first operation in a series of operations. As the first mechanical part completes its operation, through its mechanical link to the associated switch 20, it will cause the latter to change its condition as, for example, change from a position allowing the transmission of light to a position precluding the transmission of light. This change in condition will be sensed by the converter 14 which will then, as will be seen, generate an electrical signal to the controller 12. The controller 12 may then issue a control signal to the machine 10 causing Part 2 to initiate the second operation in the sequence of operations. At the conclusion of the second operation, the switch 20 associated with the second mechanical part will change its condition to thereby provide a signal to the converter and to the controller 12 which will then cause the third mechanical part to initiate the third operation in the series of operation.

The procedure will continue until the entire series of operation is performed, at which time the last mechanical part will cause the associated switch 20 to change its condition to provide a signal to the controller that the series has been completed so that the cycle may begin anew.

The foregoing is but a simple example of one form of operation performed by the system. The invention contemplates that certain of the operations may occur simultaneously or may overlap in part. The invention also contemplates that the switches may be associated with the machine 10 and the mechanical parts thereof, in such a way that certain logical functions be performed by the machine 10 and the switches 20. For example, a logical AND function can be achieved in the switches simply by arranging two or more such switches in series in a single bundle 16.

A logical OR function can be obtained by arranging two or more of the switches 20 in parallel bundles 16.

Those skilled in the art will recognize that a system such as that described may be usefully employed in an explosive environment in much the way that present-day air systems are utilized.

It will also be appreciated that a system such as that illustrated in FIG. 1 provides a significant advantage over air systems in that there is no need to maintain a particular level of cleanliness of the medium involved here, light, versus air in air systems.

It will also be appreciated that the expense of operating a system such as that shown in FIG. 1 is considerably less than that of operating an air system in that the light source 18 need only draw a few watts of power whereas a typical air compressor will have far greater power requirements.

A number of other advantages accrue from the present system, particularly when control modules, such as those illustrated in FIGS. 2 and 3 are employed. Referring first to FIG. 2, one typical construction of an optical switch 20 is illustrated and is seen to include a switch body 40 having a passage 42 extending through the body. While the passage 42 is illustrated as being straight along its entire length, it is only necessary that the same have a straight line portion where it is intersected by a cavity 44 within the body 40.

The body 40 includes, at both ends of the passage 42, a quick-disconnect fitting, generally designated 46, by which optical fiber bundles may be easily connected to the switch 20. Each fitting 46 includes a bore 48 which is aligned with passage 42 in the body 40. The bore 48 has a frusto-conical portion 50 and axially receives a collar 52. The collar 52 mounts a plurality of axially extending spring fingers 54 each of which terminates in a radially inwardly directed projection 56.

When the collars 52 and the spring fingers 54 are in the position illustrated in FIG. 2, there is substantial abutment between the frusto-conical portion 50 of the bore 48 in the radially outermost portions of the projections 56, thereby maintaining sharp hooks 58 in a position to slightly penetrate the periphery of the fiber bundles 16 which may be introduced through the center of the sleeve 52 into the bore 48. Conversely, if the sleeve is urged axially inwardly in the bore 48 from the position illustrated in FIG. 2, the enlargement of the bore 48 at the frusto-conical portion 50 allows the spring fingers 54 to deflect radially outwardly to a position whereat tight gripping of the fiber bundle 16 will not occur.

In this respect, it is noted that both sides of the hooks 58 are slanted so that when the spring fingers 54 are free to move axially outwardly due to the axial position of the collar 52 within the bore 48, axial pressure applied to the fiber bundle 16 in either direction will tend to cause the hooks 58 to be cammed radially outwardly to allow insertion or removal of the fiber bundle 16 from the bore 48.

As illustrated in FIG. 2, the bore 48, adjacent the projections 56, may be provided with an enlarged diameter portion 60 for receipt of an O-ring seal 62 which will sealingly engage the exterior of the fiber bundle 16. The seal 62 is optional but may be advantageously employed where the system is installed in an atmosphere containing dust or foreign material to prevent dust from entering the cavity 44 for purposes to be seen.

Adjacent the enlarged diameter portion 60, the fitting 46 includes an opening 64 of approximately the same diameter as the passage 42. Thus, a bundle 16 may be inserted through the fitting 46 and into the passage 42 through the opening 64.

The cavity 44, as mentioned previously, intersects the passage 42 at a straight line portion thereof. Immediately adjacent the point of intersection of the cavity 44 with the passage 42, the passage 42 on both sides of the cavity 44, is provided with an annular stop 66 of reduced diameter against which the ends of the fiber bundles 16 abut to define the previously mentioned air gap.

The cavity 44 receives an optical mask in the form of a generally L-shaped spring 68. The base 70 of the spring 68 is disposed so as to be movable into the air gap between the ends of the fiber bundle 16 and is opaque so that when moved to the dotted line position illustrated in FIG. 2, transmission of light through the fiber bundle 16 is precluded. The upright 72 of the L-shaped spring 68 has an end 74 tightly frictionally fitted in a preformed slot 76 in the body 40 to hold the spring 68 in place. Closely adjacent the end 74, the spring 68 is provided with dimple 78 and on the side of the dimple 78 remote from the end 74, an actuator 80 is received in a bore 82 in the body 40. When the actuator 80 is depressed, it will engage the spring 68 to cause the same to deflect to the dotted line position to stop the transmission of light as mentioned previously. Provision of the dimple 78 provides a snap-action type of movement of the spring 68.

The body 40 mounts a pair of upstanding ears 84 (only one of which is shown) which, in turn, mount a pivot pin 86. A finger 88 is pivotally mounted by the pin 86 and bears against the upper surface of the actuator 80. The end 90 of the finger opposite the pivot 86 is disposed to be moved by a desired mechanical part of the machine 10.

It will be observed that the optical switch illustrated in FIG. 2 does not require interengaging movable parts at the critical interface defined by the air gap between the ends of the fiber bundle 16. As a consequence, wear of component parts is held to a bare minimum, which minimum is lesser than the amount of wear encountered in air systems utilizing valves and valve seats.

Moreover, through the use of the fittings 46, interconnection of the components is extremely simple, particularly when the fiber bundles 16 are of the type commercially available from E. I. DuPont de Nemours wherein each includes a series of plastic, optical fibers 92 encased in a plastic tube 94. Such structures are quite flexible and easily routed between components. Also, no special effort is required insofar as treating the ends of the bundles 16, it merely being necessary to make a clean cut with a razor-like instrument or the like.

It will also be appreciated that there is no need requiring special parts or tools to apply a ferrule or the like to the ends of the fiber bundles 16 so as to enable them to be secured to the module components.

FIG. 3 illustrates another module in the form of an optical receiver, such as would form part of the converter 14. The module illustrated in FIG. 3 includes a body 100, one end of which is provided with a bore for receipt of fitting components identical to those described in connection with the fitting 46. The body 100 includes a passage 102 which terminates in an enlarged diameter portion 104. A photoelectric device, preferably in the form of a phototransistor 106, is received within the enlarged diameter portion 104 and has a photoresponsive surface 108 in direct light-receiving relation to the passage 102. The phototransistor 106 has electrical leads 110 extending from the side thereof opposite the surface 108 and is secured in place by a set body of electrically insulating plastic 112 through which the leads 110 extend to be coupled to the controller 12. An insulator 113, such as a wrap of plastic tape is interposed between the phototransistor 106 and the enlarged diameter portion 104.

Preferably, at least the portion of the exterior of the body 100 is threaded as at 114 for receipt of nuts 116 and 118 which may be employed to mount the body 110 in an aperture 120 in a panel 122 or the like. The fiber bundle 16 is inserted into the body 100 through the collar 52 until it abuts the surface 108 of the phototransistor 106. Again, quick assembly and disassembly are permitted, thereby maintaining the advantages of installations found in present air systems.

Those skilled in the art will appreciate, that in addition to the advantages enumerated above, another significant advantage is present in the use of an optical control system made according to the invention. Specifically, when trouble-shooting electrical systems, various equipment in the form of meters and testing devices is required. No such equipment need be employed in the present system.

In air systems, while troubleshooting is simplified over troubleshooting in electrical systems simply since one may disconnect a piece of flexible tubing from a particular element in the system and determine whether air is flowing therethrough, the present system possesses a safety advantage. In air systems, there is always the danger that the outflowing air from a conduit will direct foreign material into the eye of the troubleshooter. In the case of the present invention, there is no such danger, and the presence or absence of a signal can easily be ascertained simply by disconnecting the fiber bundle through the use of the quick-disconnect fittings and observing the end thereof to see whether the same is illuminated or dark.

We claim:

1. An optical switch comprising:
   a switch body;
   a passage extending through said body and having a straight line portion within said body;
   a pair of fittings on said body, one at each end of said passage and each including a bore aligned with said passage and selectively operable gripper means disposed within the bore for penetrating and gripping the exterior of an optical fiber bundle inserted in said bore;
   a cavity within said body and intersecting said straight line portion of said passage;

an opaque mask mounted on said body within said cavity for movement between positions in and out of said straight line portion of said passage;

an operator on said body for moving said mask between said positions; and stop means in said passage on both sides of said cavity and in close adjacency thereto for preventing insertion of an optical fiber bundle into said cavity.

2. An optical switch comprising:

a switch body;

a passage extending through said body and having a straight line portion within said body;

a pair of fittings on said body, one at each end of said passage and each including a bore aligned with said passage and selectively operable gripper means disposed within the bore for penetrating and gripping the exterior of an optical fiber bundle inserted in said bore;

a cavity within said body and intersecting said straight line portion of said passage;

an opaque mask mounted on said body within said cavity for movement between positions in and out of said straight line portion of said passage;

an operator on said body for moving said mask between said positions; and said gripper means comprising spring fingers in said bore extending axially therein and having radially inwardly directed hook means for penetrating an optical fiber bundle, said hook means having slanted surfaces engageable by the end of an optical fiber bundle whereby said hook means may be cammed radially outwardly in said bore to allow insertion of the optical fiber bundle in the passage, and means in said bore for (a) allowing said radial outward camming of said hook means within said bore for one axial position of said fingers in said bore and for (b) causing said projections to tightly grip an optical fiber bundle for another axial position of said fingers within said bore.

3. An optical control module comprising:

a body;

a passage in said body for receipt of an optical fiber bundle;

an optical control element movable within said body and disposable within said passage in direct light receiving relation therein for altering the transmission of light through said passage; and a fitting for securing an optical fiber bundle to said body within said passage including a sleeve movable axially within said fitting and having axially extending spring fingers terminating in radially inwardly directed projections;

said passage and said fingers being configured such that for one position of said sleeve within said body said projections may move radially outwardly to allow an optical fiber bundle to be inserted into and removed from said passage and for another position of said sleeve within said body, said projections cannot move radially outwardly and thus may firmly grip and optical fiber bundle within said passage.

4. The optical control module of claim 3 wherein said optical control element comprises opaque mask means movable within said body into and out of said passage to allow or block the transmission of light therethrough.

5. An optical control module comprising:

a body;

a passage in said body for receipt of an optical fiber bundle;

an optical control element within said body and disposable within said passage in direct light receiving relation therein; and a fitting for securing an optical fiber bundle to said body within said passage including a sleeve movable axially within said fitting and having axially extending spring fingers terminating in radially inwardly directed projections;

said passage and said fingers being configured such that for one position of said sleeve within said body said projections may move radially outwardly to allow an optical fiber bundle to be inserted into and removed from said passage and for another position of said sleeve within said body, said projections cannot move radially outwardly and thus may firmly grip an optical fiber bundle within said passage;

said optical control element comprising a photoelectric element having a photoresponsive surface in said passage and facing said fitting;

said passage terminating in an enlarged bore, and said photoelectric element comprising a semiconductor disposed in said enlarged bore, and means in said enlarged bore holding said semiconductor in place.

6. The optical control module of claim 5 wherein said holding means comprises a body of set plastic.

7. The optical control module of claim 6 wherein said body is externally threaded for securement to a panel or the like and wherein electrical leads for said semiconductor extend through said body of set plastic.

8. An apparatus comprising:

a machine having means for performing a series of operations;

control means for said machine initiating and terminating each of said operations of said series;

a light source;

a plurality of photoelectric devices each providing an electrical input to said control means;

a plurality of elongated fiber optic means, one for each photoelectric device, and each having one end operatively associated with a corresponding one of said photoelectric devices and another end in proximity to said machine;

directing means whereby light from said source is directed to said another ends;

a plurality of optical switches interposed between associated ones of said another ends and said directing means, each including an element mechanically linked to said machine and operated thereby to selectively allow or present the transmission of light to the associated another end during said series of operations to thereby provide optical control information to said control means; and gripper means associated with at least some of said devices and said switches for releasably gripping and penetrating said fiber optic means.

9. The apparatus of claim 8 wherein each said photoelectric device comprises a body; a passage in said body for receipt of said one end of the associated fiber optic means; a photoelectric semiconductor disposed within the passage and having a photosensitive surface in direct light receiving relation therein; and a fitting for securing said one end of the associated fiber optic means within said passage including a sleeve movable axially within said passage and having axially extending spring fingers terminating in radially inwardly directed projections, said passage and said fingers being configured such that for one position of said sleeve within said body said projections may move radially outwardly to allow said one end of the associated elongated fiber optic means to be inserted into and removed from said passage and for another position of said sleeve within said body, said projections cannot move radially outwardly and thus will firmly grip said one end of the associated elongated fiber optic means within said passage.

10. The apparatus of claim 8 wherein at least one of said optical switches comprises a switch body, a passage extending through said body and having a straight line portion within said body, a pair of fittings on said body, one at each end of said passage and each including a bore aligned with said passage and selectively operable grippers disposed within the bore for gripping the exterior of said another end of the associated elongated fiber optic means inserted in said bore, a cavity within said body and intersecting said straight line portion of said passage, and an opaque mask within said cavity and movable between positions in and out of said straight line portion of said passage, said element mechanically linked to said machine being associated with said mask for moving said mask between said positions.

11. An apparatus comprising:

a machine having moving mechanical parts for performing a series of operations;

control means for said machine for controlling the performance of the operations performed thereby;

a light source;

a plurality of photoelectric devices for providing electrical inputs to said control means;

a plurality of optical masks;

a plurality of elongated, flexible, optical fiber bundles extending from said light source to associated ones of said photoelectric devices, each said bundle having an air gap therein;

means mounting said masks for movement into and out of the air gap in an associated one of said bundles; movement of said masks into and out of said air gaps in response to movements of said machine parts to allow and preclude the passage of light from said light source to said photoelectric devices to thereby selectively provide electrical inputs to said control means; and gripper means associated with at least one said devices and said masks for releasably gripping and penetrating said fiber optic bundle.

12. The apparatus of claim 11 wherein at least one of said masks comprises an opaque body.

13. The apparatus of claim 12 wherein said opaque body is a shutter.

* * * * *